United States Patent
Peng et al.

(10) Patent No.: US 11,969,903 B1
(45) Date of Patent: Apr. 30, 2024

(54) CONTROL METHOD, ELECTRONIC DEVICE AND STORAGE MEDIUM

(71) Applicants: ZHEJIANG HENGYI PETROCHEMICAL CO., LTD., Zhejiang (CN); ZHEJIANG SHUANGTU NEW MATERIALS CO., LTD., Hangzhou (CN)

(72) Inventors: Xiantao Peng, Hangzhou (CN); Peng Wang, Hangzhou (CN); Dake Li, Hangzhou (CN); Feng Xu, Hangzhou (CN); Zheng Teng, Hangzhou (CN); Jianjun Sheng, Hangzhou (CN)

(73) Assignees: Zhejiang Hengyi Petrochemical Co., Ltd., Zhejiang (CN); Zhejiang Shuangtu New Materials Co., Ltd., Hangzhou (CN)

( * ) Notice: Subject to any disclaimer, the term of this patent is extended or adjusted under 35 U.S.C. 154(b) by 0 days.

(21) Appl. No.: 18/488,483

(22) Filed: Oct. 17, 2023

(30) Foreign Application Priority Data

Aug. 18, 2023 (CN) .......................... 202311052008.8

(51) Int. Cl.
*B25J 9/16* (2006.01)
*G06T 7/70* (2017.01)
(Continued)

(52) U.S. Cl.
CPC .............. *B25J 9/1692* (2013.01); *G06T 7/70* (2017.01); *G06V 10/7715* (2022.01);
(Continued)

(58) Field of Classification Search
CPC ........ D01H 9/18; D01H 9/00; B65H 2701/31; B65H 67/02; B65H 67/067; B25J 9/1692;
(Continued)

(56) References Cited

U.S. PATENT DOCUMENTS

2020/0346344 A1* 11/2020 Hugelier .............. B25J 15/0047
2022/0074084 A1* 3/2022 Zhang ...................... D01H 9/00

FOREIGN PATENT DOCUMENTS

AU 2021340273 A1 * 5/2023 ............. B65H 51/16
CN 106182004 A 12/2016
(Continued)

OTHER PUBLICATIONS

Japanese Notice of Reasons for Refusal (w/ English translation) for corresponding Application No. JP2023-199587, dated Dec. 26, 2023, 6 pages.

*Primary Examiner* — Harry Y Oh
(74) *Attorney, Agent, or Firm* — Dority & Manning, P.A.

(57) ABSTRACT

Provided is a control method, an electronic device and a storage medium. The method includes: obtaining a first target image collected by a first collection device and a second target image collected by a second collection device, in a case of it is determined that characteristic information of a mechanical gripper satisfies a first preset requirement; detecting a first center position of the mechanical gripper in the first target image and a second center position of a target spindle with yarn in the second target image; and generating a calibration instruction, in a case of it is determined that a target position relationship between the first center position and the second center position does not satisfy a second preset requirement, where the calibration instruction is used to calibrate a center position of the mechanical gripper or to calibrate a center position of the target spindle with yarn.

20 Claims, 6 Drawing Sheets

(51) Int. Cl.
*G06V 10/77* (2022.01)
*G06V 10/80* (2022.01)
*G06V 10/82* (2022.01)

(52) U.S. Cl.
CPC ............ *G06V 10/806* (2022.01); *G06V 10/82* (2022.01); *G06T 2207/20084* (2013.01); *G06V 2201/06* (2022.01)

(58) Field of Classification Search
CPC ............ G06T 7/70; G06T 2207/20084; G06V 10/7715; G06V 10/806; G06V 10/82; G06V 2201/06
See application file for complete search history.

(56) References Cited

FOREIGN PATENT DOCUMENTS

| | | | |
|---|---|---|---|
| EP | 4296207 | A1 * | 5/2023 |
| JP | S606565 | A | 1/1985 |
| JP | 2002307345 | A | 10/2002 |
| JP | 2009167586 | A | 7/2009 |
| JP | 2019093461 | A | 6/2019 |
| JP | 2021075395 | A | 5/2021 |

* cited by examiner

US 11,969,903 B1

CONTROL METHOD, ELECTRONIC DEVICE AND STORAGE MEDIUM

CROSS-REFERENCE TO RELATED APPLICATIONS

The present application claims priority to Chinese Patent Application No. CN202311052008.8, filed with the China National Intellectual Property Administration on Aug. 18, 2023, the disclosure of which is hereby incorporated herein by reference in its entirety.

TECHNICAL FIELD

The present disclosure relates to a field of data processing technology, and in particular, to a control method and apparatus, a device and a storage medium.

BACKGROUND

In a production workshop of spindles with yarn, when a robot grabs a spindle with yarn from a loading cart, there will be a problem of inaccurate positioning due to mechanical wear and other factors, so that the mechanical gripper of the robot damages the spindle with yarn when grabbing, or even cannot successfully grab the spindle with yarn. Therefore, a method of calibrating the grabbing position of the robot is urgently needed.

SUMMARY

The present disclosure provides a control method and apparatus, a device and a storage medium, to solve or alleviate one or more technical problems in the prior art.

In a first aspect, the present disclosure provides a control method, including: obtaining a first target image collected by a first collection device and a second target image collected by a second collection device, in a case of it is determined that characteristic information of a mechanical gripper satisfies a first preset requirement; wherein the first collection device is configured to perform image collection for the mechanical gripper; and the second collection device is configured to perform image collection for a target spindle with yarn on a loading cart to be grabbed by the mechanical gripper; detecting a first center position of the mechanical gripper in the first target image, and detecting a second center position of the target spindle with yarn in the second target image; and generating a calibration instruction, in a case of it is determined that a target position relationship between the first center position and the second center position does not satisfy a second preset requirement, wherein the calibration instruction is used to calibrate a center position of the mechanical gripper or to calibrate a center position of the target spindle with yarn to be grabbed by the mechanical gripper.

In a second aspect, the present disclosure provides a control apparatus, including: an obtaining unit configured to obtain a first target image collected by a first collection device and a second target image collected by a second collection device, in a case of it is determined that characteristic information of a mechanical gripper satisfies a first preset requirement; wherein the first collection device is configured to perform image collection for the mechanical gripper; and the second collection device is configured to perform image collection for a target spindle with yarn on a loading cart to be grabbed by the mechanical gripper; a detection unit configured to detect a first center position of the mechanical gripper in the first target image, and detect a second center position of the target spindle with yarn in the second target image; and a processing unit configured to generate a calibration instruction, in a case of it is determined that a target position relationship between the first center position and the second center position does not satisfy a second preset requirement, wherein the calibration instruction is used to calibrate a center position of the mechanical gripper or to calibrate a center position of the target spindle with yarn to be grabbed by the mechanical gripper.

In a third aspect, provided is an electronic device, including: at least one processor; and a memory connected in communication with the at least one processor.

The memory stores an instruction executable by the at least one processor, and the instruction, when executed by the at least one processor, enables the at least one processor to execute any method of embodiments of the present disclosure.

In a fourth aspect, provided is a non-transitory computer-readable storage medium storing a computer instruction thereon, and the computer instruction is used to cause a computer to execute any method of the embodiments of the present disclosure.

In a fifth aspect, provided is a computer program product including a computer program, and the computer program implements any method of the embodiments of the present disclosure, when executed by a processor.

In this way, the solution of the present disclosure can detect the center position of the mechanical gripper and the center position of the target spindle with yarn based on the obtained first target image and second target image, so as to determine the target position relationship between them and then calibrate according to the target position relationship. Thus, the problem of inaccurate positioning and grabbing caused by mechanical wear can be quickly dealt with, effectively improving the grabbing accuracy of the mechanical gripper, and providing technical support for smooth automatic calibration of the grabbing position of the mechanical gripper. It should be understood that the content described in this part is not intended to identify critical or essential features of the embodiments of the present disclosure, nor is it used to limit the scope of the present disclosure. Other features of the present disclosure will be easily understood through the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

DETAILED DESCRIPTION

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those having ordinary skill in the art should understand that the present disclosure may be performed without certain specific details. In some examples, methods, means, elements and circuits well known to those having ordinary skill in the art are not described in detail, in order to highlight the subject matter of the present disclosure.

In a production workshop of spindles with yarn, when a robot grabs a spindle with yarn from a loading cart, there will be a problem of inaccurate positioning due to mechanical wear and other factors, so that the mechanical gripper of the robot damages the spindle with yarn when grabbing, or even cannot successfully grab the spindle with yarn.

Based on this, the solution of the present disclosure proposes a control method to calibrate the grabbing position of the robot.

Figure 1:
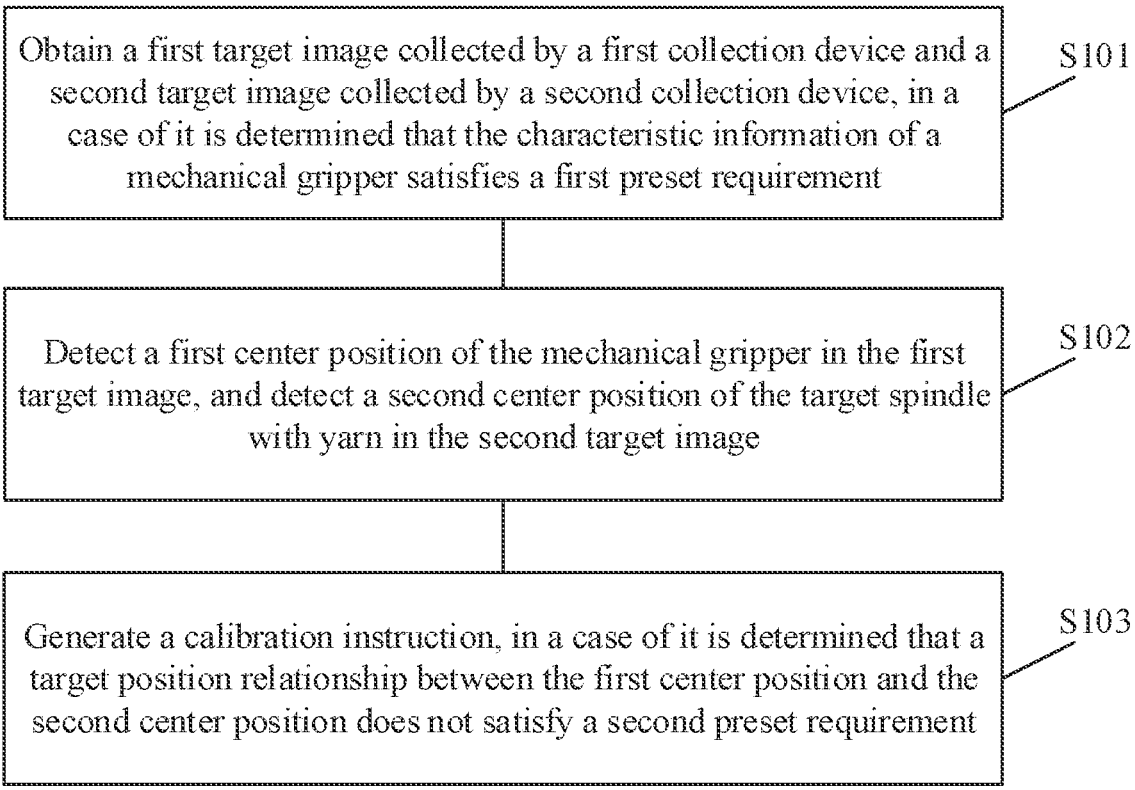
FIG. 1 is a first schematic flowchart of a control method according to an embodiment of the present application.

Specifically, FIG. 1 is a first schematic flowchart of a control method according to an embodiment of the present application. This method is optionally applied in electronic devices, such as personal computers, servers, server clusters and other electronic devices.

Further, this method includes at least a part of the following content. As shown in FIG. 1, this method includes:

Step S101: obtaining a first target image collected by a first collection device and a second target image collected by a second collection device when determining that the characteristic information of a mechanical gripper satisfies a first preset requirement.

Here, the first collection device is configured to perform image collection for the mechanical gripper; and the second collection device is configured to perform image collection for a target spindle with yarn on a loading cart to be grabbed by the mechanical gripper.

In one example, the first collection device may be disposed at any position capable of collecting the complete mechanical gripper, for example, the first collection device is disposed on the loading cart; and the second collection device may be disposed at any position capable of collecting the complete target spindle with yarn on the loading cart can, for example, the second collection device is disposed on a mechanical arm where the mechanical gripper is located, which are not limited in the present disclosure.

Figure 2A:
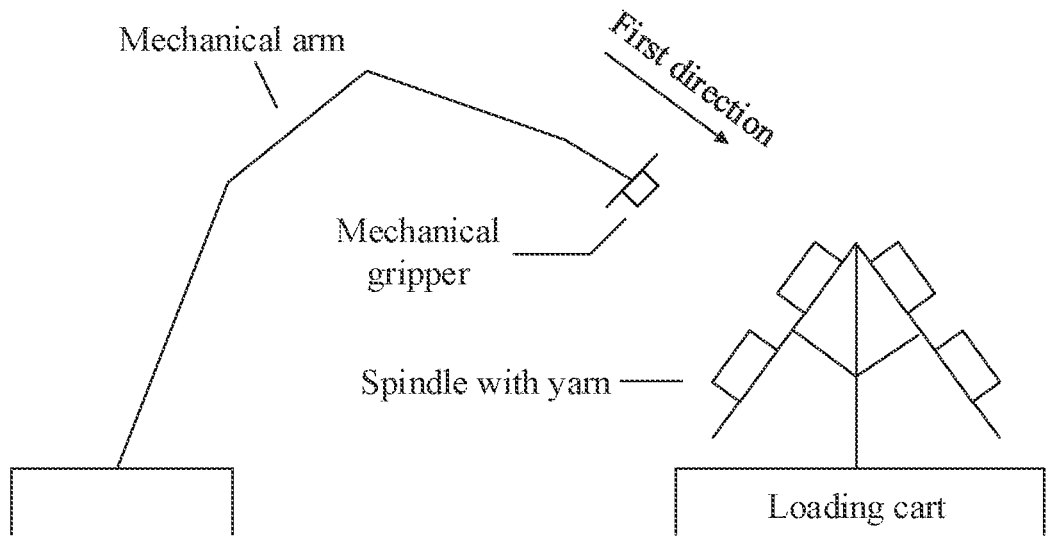
FIGS. 2(a) and 2(b) are schematic diagrams of a scene in which a mechanical gripper grabs a spindle with yarn according to an embodiment of the present application.
Figure 2B:
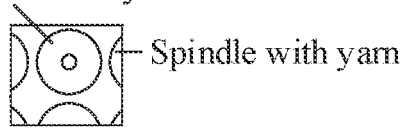

Further, the first collection device (or the second collection device) may specifically include a camera. For example, the first target image is obtained by using the camera to perform image collection on the mechanical gripper; for example, the camera is used to shoot the mechanical gripper to obtain the first target image, or perform video collection on the mechanical gripper for a preset duration to obtain a plurality of continuous video frames and select one image from the continuous video frames as the first target image. Here, the second collection device is similar to the first collection device, and will not be repeated here. It should be pointed out that the target spindle with yarn is a spindle with yarn that the mechanical gripper currently needs to grab from the loading cart. In an example, as shown in FIG. 2(a), the mechanical gripper is fixed at the end of the mechanical arm, and the mechanical gripper extends towards the loading cart in the first direction. At this time, when the mechanical gripper moves to a specific position and the mechanical gripper is about to grab the target spindle with yarn, the first collection device disposed on the mechanical arm can collect the target spindle with yarn to be grabbed by the mechanical gripper, as shown in FIG. 2(b), to obtain the first target image containing the complete target spindle with yarn. It can be understood that the detailed information of the target body contained in the collected first target image may be controlled by adjusting the position of the first collection device disposed on the mechanical arm. For example, the position of the first collection device disposed on the mechanical arm is adjusted, so that the collected first target image contains a complete spindle with yarn, and the complete spindle with yarn is the target spindle with yarn, thus effectively avoiding other spindles with yarn around the target spindle with yarn from interfering with the identification of the center position of the target spindle with yarn, and then laying the foundation for effectively improving the calibration accuracy.

Further, the characteristic information of the mechanical gripper may specifically include but is not limited to at least one of: the operating duration of the mechanical gripper, the number of times the mechanical gripper grabs the spindle with yarn on the loading cart, etc.

In one example, the operating duration of the mechanical gripper is determined, and the first target image collected by the first collection device and the second target image collected by the second collection device are obtained when the operating duration of the mechanical gripper reaches a preset operating duration.

Alternatively, in another example, the number of times the mechanical gripper grabs the spindle with yarn on the loading cart is counted, and the first target image collected by the first collection device and the second target image collected by the second collection device are obtained when the number of times reaches a preset number of times.

Step S102: detecting a first center position of the mechanical gripper in the first target image, and detecting a second center position of the target spindle with yarn in the second target image.

In a specific example, the first center position and the second center position may be obtained in the following manner; specifically, the above step of detecting the first center position of the mechanical gripper in the first target image and detecting the second center position of the target spindle with yarn in the second target image (that is, the above step S102) specifically includes: Step S102-1: inputting the first target image into a target detection model to obtain the first center position of the mechanical gripper in the first target image.

Step S102-2: inputting the second target image into the target detection model to obtain the second center position of the target spindle with yarn in the second target image.

Further, in a specific example, the target detection model in step S102-1 (or step S102-2) described above includes at least a first network layer, a second network layer, and a third network layer.

Here, the first network layer includes at least a first sub-network layer, a second sub-network layer and a third sub-network layer; the first sub-network layer is configured to perform first convolution processing on an input image to obtain a first convolution feature map; the second sub-network layer is configured to perform linear processing on the first convolution feature map to obtain a linear feature map, and perform connection processing on the linear feature map and the first convolution feature map to obtain a connection feature map; and the third sub-network layer is configured to perform second convolution processing on the connection feature map to obtain a second convolution feature map, thus effectively improving the richness of the extracted features, and then improving the accuracy of subsequent identification of the mechanical gripper or target spindle with yarn.

Figure 3:
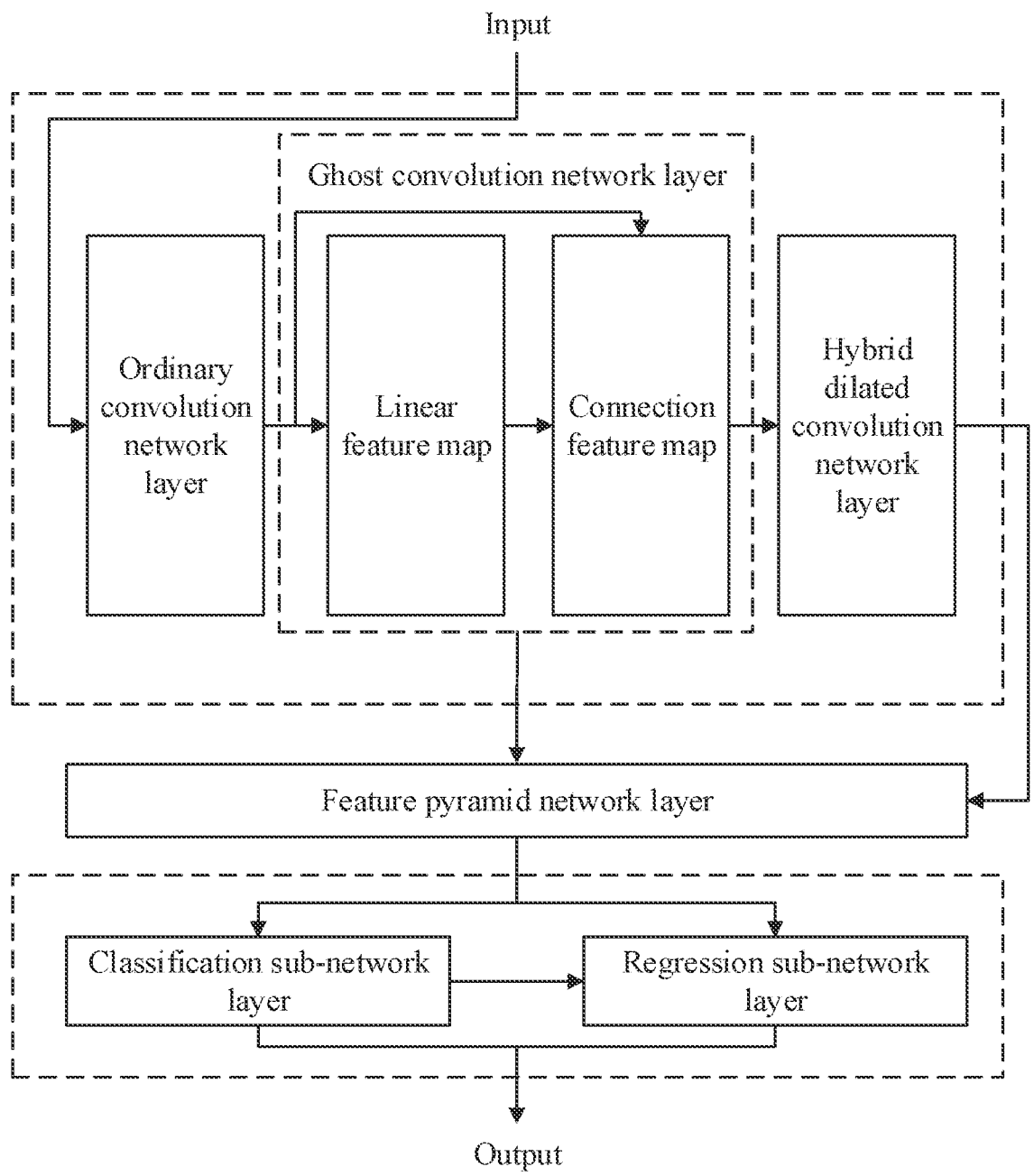
FIG. 3 is a schematic structural diagram of a target detection model according to an embodiment of the present application.

For example, in one example, the above-mentioned first network layer is a ghost network (GhostNet) layer, and further, the first sub-network layer included in the GhostNet layer is an ordinary convolution (Conv) network layer, the second sub-network layer is a ghost convolution (Ghost-Conv) network layer, and the third sub-network layer is a Hybrid Dilated Convolution (HDC) network layer. As shown in FIG. 3, firstly an image (such as the first target image or the second target image) is input into the ordinary convolution network layer to obtain an ordinary convolution feature map of the image; secondly the ordinary convolution feature map is input into the ghost convolution network layer, for example, a linear feature map is obtained after linear processing through the ghost convolution network layer, and the linear feature map and the ordinary convolution feature map are connected to obtain a connection feature map; and finally the connection feature map is input to the hybrid dilated convolution network layer to obtain a hybrid dilated convolution feature map.

Further, the second network layer is configured to perform first convolution processing on the connection feature map and the second convolution feature map respectively, and perform feature fusion processing on processed results to obtain a fusion feature map. For example, the second network layer is a Feature Pyramid Network (FPN) layer. As shown in FIG. 3, the connection feature map and the hybrid dilated convolution feature map obtained in the ghost network layer are input to the FPN layer for feature fusion processing to obtain the fusion feature map.

Further, the third network layer includes a fourth sub-network layer and a fifth sub-network layer, the fourth sub-network layer is configured to identify the mechanical gripper or the target spindle with yarn in an image based on the fusion feature map; and the fifth sub-network layer is configured to obtain the center position of the mechanical gripper in the image or the center position of the target spindle with yarn in the image based on the fusion feature map; for example, the fifth sub-network layer is configured to obtain the center position of the mechanical gripper in the image or the center position of the target spindle with yarn in the image based on the fusion feature map and the output result of the fourth sub-network layer.

For example, the fourth sub-network layer is a classification sub-network layer, and the fifth sub-network layer is a regression sub-network layer. As shown in FIG. 3, the output result (such as the fusion feature map) of the FPN layer is input to the classification sub-network layer, to identify the mechanical gripper in the image, for example, frame the mechanical gripper in the image; and the fusion feature map and the mechanical gripper in the framed image (for example, a part of the image containing the mechanical gripper) are input into the regression sub-network layer, to obtain the center position of the mechanical gripper in the image; or, the fusion feature map is input into the classification sub-network layer, to identify the target spindle with yarn in the image, for example, frame the target spindle with yarn in the image; and the fusion feature map and the target spindle with yarn in the framed image (for example, a part of the image containing the target spindle with yarn) are input to the regression sub-network layer, to obtain the center position of the target spindle with yarn in the image.

In this way, the solution of the present disclosure can use the target detection model to obtain the center position of the mechanical gripper and the center position of the target spindle with yarn, thereby facilitating the determination of the target position relationship between them, and thus laying the foundation for the subsequent calibration of the grabbing position of the mechanical gripper.

Step S103: generating a calibration instruction when determining that a target position relationship between the first center position and the second center position does not satisfy a second preset requirement, where the calibration instruction is used to calibrate a center position of the mechanical gripper or to calibrate a center position of the target spindle with yarn to be grabbed by the mechanical gripper.

In this way, the solution of the present disclosure can detect the center position of the mechanical gripper and the center position of the target spindle with yarn based on the obtained first target image and second target image, so as to determine the target position relationship between them and then calibrate according to the target position relationship. Thus, the problem of inaccurate positioning and grabbing caused by mechanical wear can be quickly dealt with, effectively improving the grabbing accuracy of the mechanical gripper, and providing technical support for smooth automatic calibration of the grabbing position of the mechanical gripper.

Further, in the production workshop of spindles with yarn, especially in the automatic packaging process of spindles with yarn, the solution of the present disclosure can enable the mechanical gripper to accurately locate and grab the spindle with yarn, laying the foundation for subsequently avoiding the damage caused when grabbing the spindle with yarn, and simultaneously laying the foundation for ensuring the normal operation of the packaging service of the spindle with yarn and greatly improving the packaging efficiency.

Figure 4:
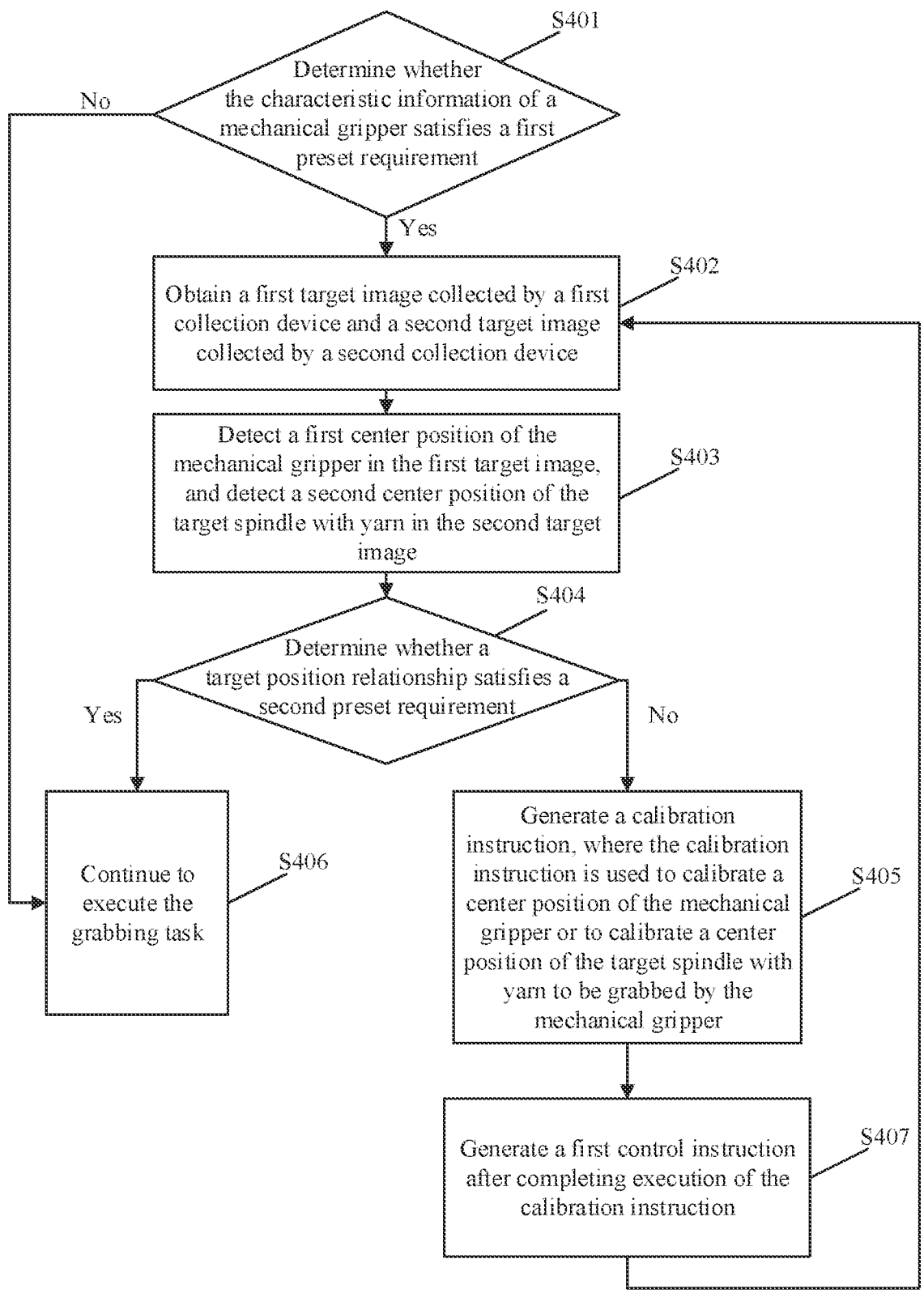
FIG. 4 is a second schematic flowchart of a control method according to an embodiment of the present application.

In a specific example, after the calibration instruction is executed, the calibration result may also be verified. In this way, it can be ensured that the grabbing position of the mechanical gripper is successfully calibrated, laying the foundation for subsequently enabling the mechanical gripper to accurately grab the spindle with yarn. Specifically, FIG. 4 is a second schematic flowchart of a control method according to an embodiment of the present application. This method may be optionally applied in electronic devices, such as personal computers, servers, server clusters and other electronic devices. It can be understood that the relevant content of the method shown in FIG. 1 described above may also be applied to this example, and the relevant content will not be repeated in this example.

Further, this method includes at least a part of the following content. Specifically, as shown in FIG. 4, this method includes:

Step S401: determining whether the characteristic information of a mechanical gripper satisfies a first preset requirement. If so, proceed to step S402; otherwise, proceed to step S406.

Step S402: obtaining a first target image collected by a first collection device and a second target image collected by a second collection device. And enter step S403.

Step S403: detecting a first center position of the mechanical gripper in the first target image, and detecting a second center position of the target spindle with yarn in the second target image. And enter step S404.

Step S404: determining whether a target position relationship between the first center position and the second center position satisfies a second preset requirement. If so, proceed to step S406; otherwise, proceed to step S405.

Step S405: generating a calibration instruction when determining that the target position relationship between the first center position and the second center position does not satisfy the second preset requirement, where the calibration instruction is used to calibrate a center position of the mechanical gripper or to calibrate a center position of the target spindle with yarn to be grabbed by the mechanical gripper. And enter step S407.

Step S406: continuing to execute the grabbing task.

Step S407: generating a first control instruction after completing execution of the calibration instruction, and returning to step S402 to re-obtain a new first target image and a new second target image.

Here, the first control instruction is used to instruct the first collection device to collect the new first target image, and instruct the second collection device to collect the new second target image.

That is to say, in the current calibration process, the new first target image and the new second target image can be re-obtained after the execution of the generated calibration instruction is completed, and the first center position of the mechanical gripper in the new first target image and the second center position of the target spindle with yarn in the new second target image are detected based on the new first target image and the new second target image, to thereby obtain a new target position relationship. At this time, it is judged whether the obtained new target position relationship satisfies the second preset requirement; if so (that is, the second preset requirement is satisfied), the calibration is successful and the current calibration process ends; otherwise (that is, the second preset requirement is not satisfied), a new calibration instruction is generated until the new target position relationship satisfies the second preset requirement.

Figure 5:
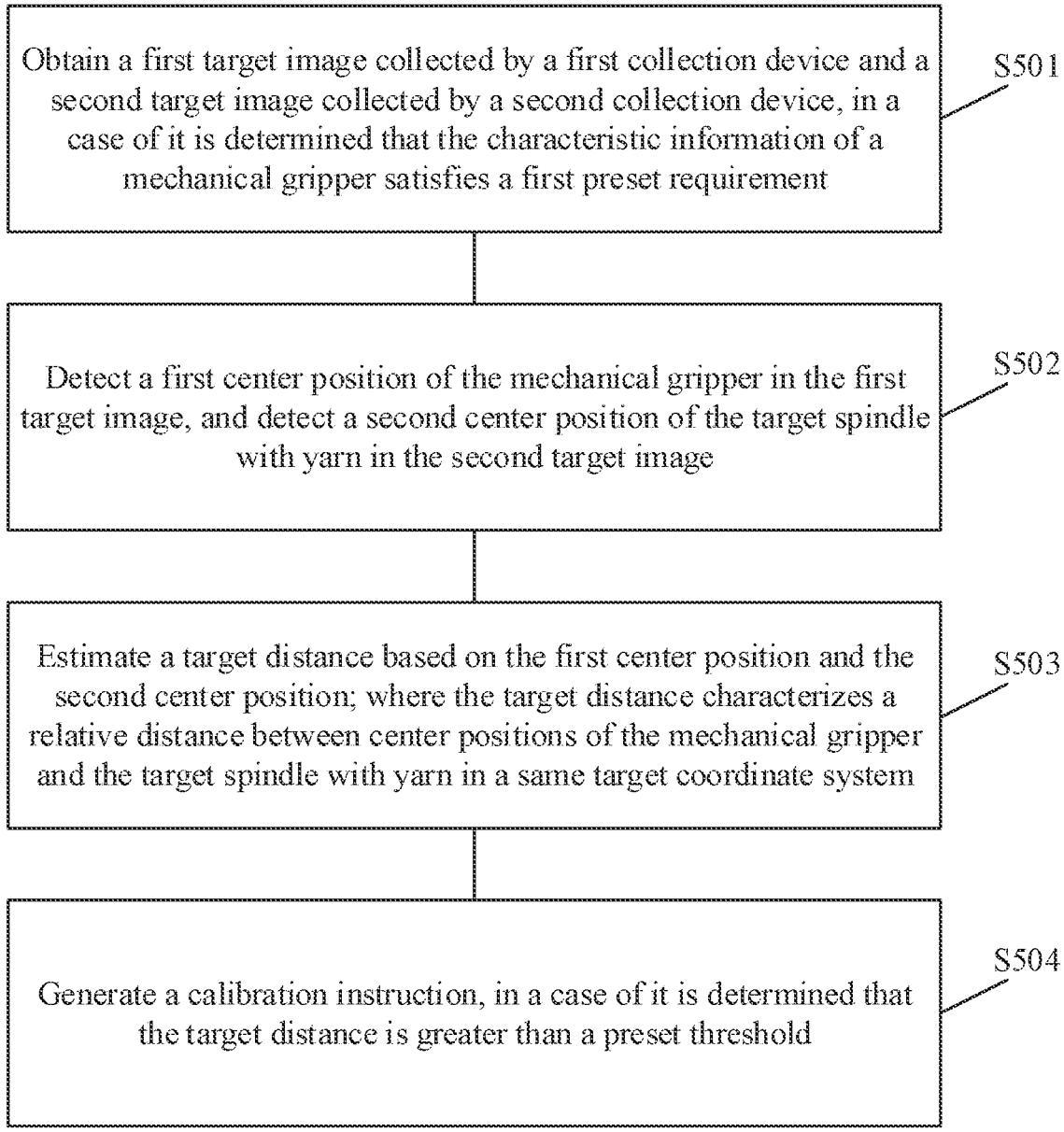
FIG. 5 is a third schematic flowchart of a control method according to an embodiment of the present application.

In a specific example, FIG. 5 is a third schematic flowchart of a control method according to an embodiment of the present application. This method may be optionally applied in electronic devices, such as personal computers, servers, server clusters and other electronic devices. It can be understood that the relevant content of the method shown in FIG. 1 described above may also be applied to this example, and the relevant content will not be repeated in this example.

Further, this method includes at least a part of the following content. Specifically, as shown in FIG. 5, this method includes:

Step S501: obtaining a first target image collected by a first collection device and a second target image collected by a second collection device when determining that the characteristic information of a mechanical gripper satisfies a first preset requirement.

Here, the first collection device is configured to perform image collection for the mechanical gripper; and the second collection device is configured to perform image collection for a target spindle with yarn on a loading cart to be grabbed by the mechanical gripper.

Step S502: detecting a first center position of the mechanical gripper in the first target image, and detecting a second center position of the target spindle with yarn in the second target image.

Here, for the detection of the first center position and the second center position, reference can be made to the above example, and details are not repeated here.

Step S503: estimating a target distance based on the first center position and the second center position; where the target distance characterizes a relative distance between center positions of the mechanical gripper and the target spindle with yarn in a same target coordinate system.

Here, the first center position is position information in a first coordinate system corresponding to the first target image; the second center position is position information in a second coordinate system corresponding to the second target image; and the target coordinate system is one of the first coordinate system, the second coordinate system and the world coordinate system.

That is to say, after step S502, the target distance for describing the target position relationship may also be estimated based on the obtained first center position and second center position. In this way, it is convenient to determine whether the calibration is required based on the target distance.

Step S504: generating a calibration instruction when determining that the target distance is greater than a preset threshold.

Further, in a specific example, the target distance may be obtained in the following manner; specifically, the above step of estimating the target distance based on the first center position and the second center position (that is, the above step S503) specifically includes:

Step S503-1: estimating a first center coordinate of the mechanical gripper in the target coordinate system based on the first center position.

For example, in an example, when the target coordinate system is the first coordinate system, the first center coordinate can be directly obtained based on the first center position. For example, when the first center position is a coordinate point, the coordinate point representing the first center position can be directly used as the first center coordinate in the first coordinate system; or, when the first center position is a center area (for example, a center area containing a plurality of coordinate points), a center coordinate can be obtained based on the plurality of coordinate points in the center area, and the obtained center coordinate is directly used as the first center coordinate in the first coordinate system.

Alternatively, in another example, when the target coordinate system is the second coordinate system, the first center coordinate of the target spindle with yarn in the second coordinate system can also be estimated based on the first center position and a coordinate transformation relationship between the first coordinate system and the second coordinate system. For example, when the first center position is a coordinate point, the coordinate point representing the first center position can be converted to the second coordinate system based on the coordinate transformation relationship between the first coordinate system and the second coordinate system, to obtain the first center coordinate; or, when the first center position is a center area (for example, a center area containing a plurality of coordinate points), a center coordinate corresponding to the first center position can be obtained based on the plurality of coordinate points in the center area, and the obtained center coordinate corresponding to the first center position is converted to the second coordinate system, to obtain the first center coordinate; or, when the first center position is a center area (for example, a center area containing a plurality of coordinate points), the plurality of coordinate points in the center area are respectively converted to the second coordinate system based on the coordinate transformation relationship between the first coordinate system and the second coordinate system, to obtain a plurality of coordinate points in the second coordinate system, and then obtain the first center coordinate based on the plurality of coordinate points in the second coordinate system.

Alternatively, in yet another example, when the target coordinate system is the world coordinate system, the first center coordinate of the target spindle with yarn in the world coordinate system can also be estimated based on the first center position and a coordinate transformation relationship between the first coordinate system and the world coordinate system. For example, when the first center position is a coordinate point, the coordinate point representing the first center position can be converted to the world coordinate system based on the coordinate transformation relationship between the first coordinate system and the world coordinate system, to obtain the first center coordinate; or, when the first center position is a center area (for example, a center area containing a plurality of coordinate points), a center coordinate corresponding to the first center position can be obtained based on the plurality of coordinate points in the center area, and the obtained center coordinate corresponding to the first center position is converted to the world coordinate system, to obtain the first center coordinate; or, when the first center position is a center area (for example, a center area containing a plurality of coordinate points), the plurality of coordinate points in the center area are respectively converted to the world coordinate system based on the coordinate transformation relationship between the first coordinate system and the world coordinate system, to obtain a plurality of coordinate points in the world coordinate system, and then obtain the first center coordinate based on the plurality of coordinate points in the world coordinate system.

Step S503-2: estimating a second center coordinate of the target spindle with yarn in the target coordinate system based on the second center position.

For example, in an example, when the target coordinate system is the first coordinate system, the second center coordinate of the target spindle with yarn in the first coordinate system can also be estimated based on the second center position and a coordinate transformation relationship between the first coordinate system and the second coordinate system. For example, when the second center position is a coordinate point, the coordinate point representing the second center position can be converted to the first coordinate system based on the coordinate transformation relationship between the first coordinate system and the second coordinate system, to obtain the second center coordinate; or, when the second center position is a center area (for example, a center area containing a plurality of coordinate points), a center coordinate corresponding to the second center position can be obtained based on the plurality of coordinate points in the center area, and the obtained center coordinate corresponding to the second center position is converted to the first coordinate system, to obtain the second center coordinate. Alternatively, when the second center position is a center area (for example, a center area containing a plurality of coordinate points), the plurality of coordinate points in the center area are respectively converted to the first coordinate system based on the coordinate transformation relationship between the first coordinate system and the second coordinate system, to obtain a plurality of coordinate points in the first coordinate system, and then obtain the second center coordinate based on the plurality of coordinate points in the first coordinate system.

Alternatively, in another example, when the target coordinate system is the second coordinate system, the second center coordinate can be directly obtained based on the second center position. For example, when the second center position is a coordinate point, the coordinate point representing the second center position can be directly used as the second center coordinate in the second coordinate system; or, when the second center position is a center area (for example, a center area containing a plurality of coordinate points), a center coordinate can be obtained based on the plurality of coordinate points in the center area, and the obtained center coordinate is directly used as the second center coordinate in the second coordinate system.

Alternatively, in yet another example, when the target coordinate system is the world coordinate system, the second center coordinate of the target spindle with yarn in the world coordinate system can also be estimated based on the second center position and a coordinate transformation relationship between the second coordinate system and the world coordinate system. For example, when the second center position is a coordinate point, the coordinate point representing the second center position can be converted to the world coordinate system based on the coordinate transformation relationship between the second coordinate system and the world coordinate system, to obtain the second center coordinate; or, when the second center position is a center area (for example, a center area containing a plurality of coordinate points), a center coordinate corresponding to the second center position can be obtained based on the plurality of coordinate points in the center area, and the obtained center coordinate corresponding to the second center position is converted to the world coordinate system, to obtain the second center coordinate; or when the second center position is a center area (for example, a center area containing a plurality of coordinate points), the plurality of coordinate points in the center area are respectively converted to the world coordinate system based on the coordinate transformation relationship between the second coordinate system and the world coordinate system, to obtain a plurality of coordinate points in the world coordinate system, and then obtain the second center coordinate based on the plurality of coordinate points in the world coordinate system.

Step S503-3: obtaining the target distance based on the first center coordinate of the mechanical gripper in the target coordinate system and the second center coordinate of the target spindle with yarn in the target coordinate system.

In this way, the solution of the present disclosure can estimate the target distance for describing the target position relationship based on the center position of the mechanical gripper and the center position of the target spindle with yarn obtained by detection, and then can calibrate the grabbing position of the mechanical gripper according to the target distance. Thus, the problem of inaccurate positioning and grabbing caused by mechanical wear can be quickly dealt with, effectively improving the grabbing accuracy of the mechanical gripper, laying the foundation for subsequently improving the grabbing efficiency of the mechanical gripper to grab the spindle with yarn, and also laying the foundation for subsequently avoiding the damage caused when grabbing the spindle with yarn and avoiding the failure to grab the spindle with yarn.

Further, in a specific example, the calibration instruction may also be generated in the following manner; specifically, the above step of generating the calibration instruction when determining that the target distance is greater than the preset threshold (that is, the above step S504) specifically includes:

(1) generating the calibration instruction when determining that the target distance is greater than a first-level critical value and the target distance is less than or equal to a second-level critical value, where the calibration instruction is used to instruct to adjust a control parameter of the mechanical gripper based on the target distance;

or (2) generating the calibration instruction when determining that the target distance is greater than the first-level critical value and the target distance is greater than the second-level critical value, where the calibration instruction is used to instruct to adjust a position of the loading cart where the target spindle with yarn is located based on the target distance.

Here, the first-level critical value is less than the second-level critical value, and the first-level critical value and the second-level critical value are both empirical values and can be set according to actual needs, which are not limited in the solution of the present disclosure.

Figure 6:
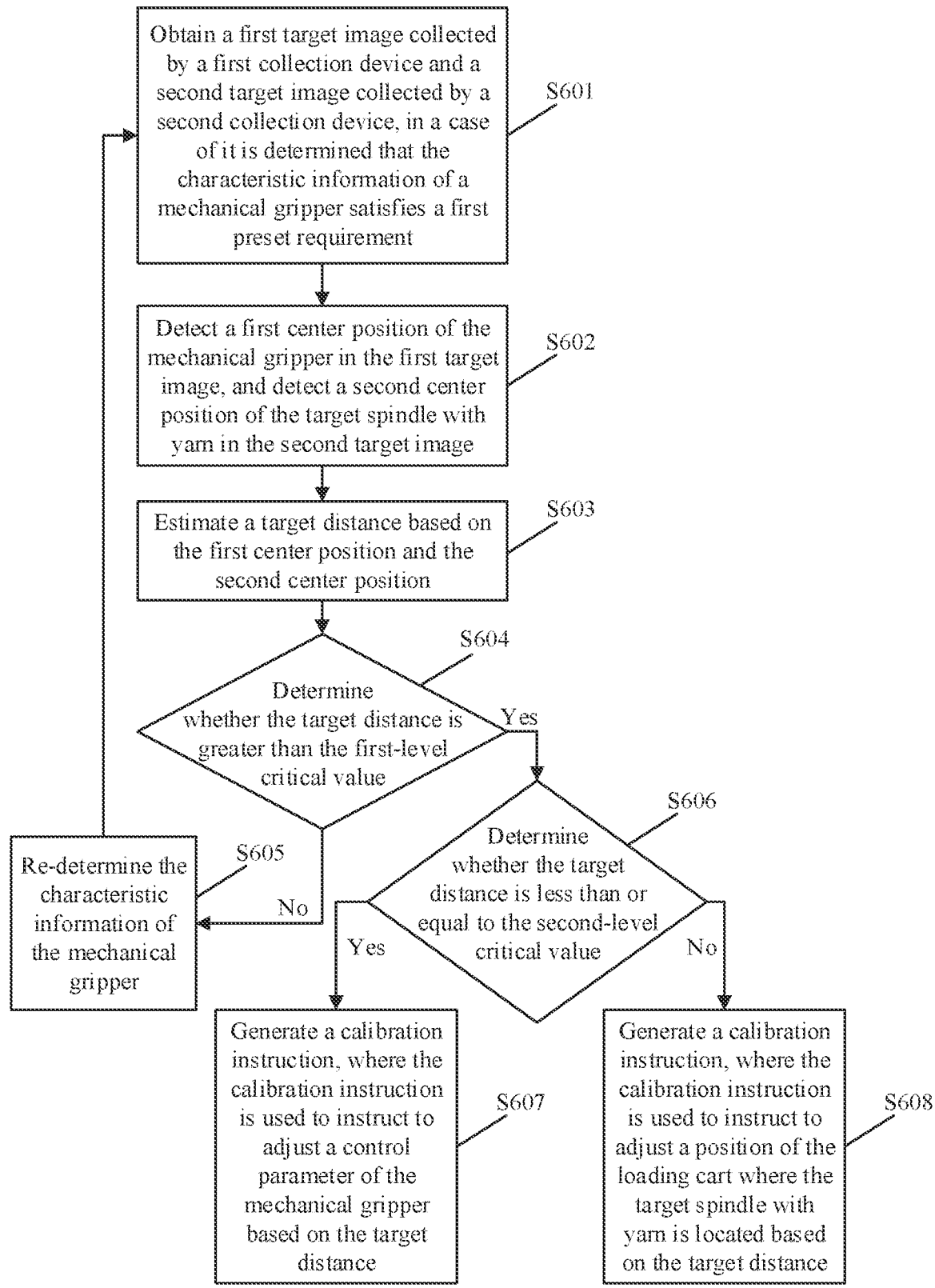
FIG. 6 is a fourth schematic flowchart of a control method according to an embodiment of the present application.

Specifically, FIG. 6 is a fourth schematic flowchart of a control method according to an embodiment of the present application. This method may be optionally applied in electronic devices, such as personal computers, servers, server clusters and other electronic devices. It can be understood that the relevant content of the methods shown in FIG. 1 and FIG. 5 described above may also be applied to this example, and the relevant content will not be repeated in this example.

Further, this method includes at least a part of the following content. Specifically, as shown in FIG. 6, this method includes:

Step S601: obtaining a first target image collected by a first collection device and a second target image collected by a second collection device when determining that the characteristic information of a mechanical gripper satisfies a first preset requirement.

Here, the first collection device is configured to perform image collection for the mechanical gripper; and the second collection device is configured to perform image collection for a target spindle with yarn on a loading cart to be grabbed by the mechanical gripper.

Step S602: detecting a first center position of the mechanical gripper in the first target image, and detecting a second center position of the target spindle with yarn in the second target image.

Step S603: estimating a target distance based on the first center position and the second center position; where the target distance characterizes a relative distance between center positions of the mechanical gripper and the target spindle with yarn in a same target coordinate system.

Here, the first center position is position information in a first coordinate system corresponding to the first target image; the second center position is position information in a second coordinate system corresponding to the second target image; and the target coordinate system is one of the first coordinate system, the second coordinate system and the world coordinate system.

Step S604: determining whether the target distance is greater than the first-level critical value. If so, proceed to step S606; otherwise, proceed to step S605.

Step S605: re-determining the characteristic information of the mechanical gripper, and returning to step S601.

For example, when it is determined that the operating duration of the mechanical gripper reaches a preset duration (such as 1 hour) and the target distance is less than the first-level critical value, the operating duration of the mechanical gripper is initialized, the operating duration of the mechanical gripper is re-counted, and it is judged whether the re-counted operating duration reaches 1 hour; or, for example, when it is determined that the number of times of grabbing by the mechanical gripper reaches a preset number of times (such as 80) and the target distance is less than the first-level critical value, the number of times of grabbing by the mechanical gripper is initialized, the number of times of grabbing by the mechanical gripper is re-counted, and it is judged whether the re-counted number of times reaches 80.

Step S606: determining whether the target distance is less than or equal to the second-level critical value. If so, proceed to step S607; otherwise, proceed to step S608.

Step S607: generating a calibration instruction when determining that the target distance is greater than the first-level critical value and the target distance is less than or equal to the second-level critical value, where the calibration instruction is used to instruct to adjust a control parameter of the mechanical gripper based on the target distance.

Step S608: generating a calibration instruction when determining that the target distance is greater than the first-level critical value and the target distance is greater than the second-level critical value, where the calibration instruction is used to instruct to adjust a position of the loading cart where the target spindle with yarn is located based on the target distance.

It can be understood that the target distance in the same target coordinate system is estimated when the first center position and the second center position are obtained; it is judged whether the obtained target distance is greater than the first-level critical value; if so (that is, greater than the first-level critical value), it is judged whether the obtained target distance is less than or equal to the second-level critical value; if so (that is, less than or equal to the second-level critical value), a calibration instruction is generated to instruct to adjust the control parameter of the mechanical gripper based on the target distance, thereby realizing the adjustment of the center position of the mechanical gripper. It can be understood that, in this example, it can be considered that the deviation between the center positions of the mechanical gripper and the target spindle with yarn is relatively small when the obtained target distance is greater than the first-level critical value and less than or equal to the second-level critical value. At this time, the control parameter of the mechanical gripper can be adjusted through fine-tuning to adjust the center position of the mechanical gripper, thereby reducing the distance between the center positions of the mechanical gripper and the target spindle with yarn.

Further, when the obtained target distance is greater than the first-level critical value, if the obtained target distance is also greater than the second-level critical value, a calibration instruction is generated to instruct to adjust the position of the loading cart where the target spindle with yarn is located based on the target distance, thereby realizing the adjustment of the center position of the target spindle with yarn. It can be understood that, in this example, it can be considered that the deviation between the center positions of the mechanical gripper and the target spindle with yarn is relatively large when the obtained target distance is greater than the second-level critical value. At this time, the grabbing position of the mechanical gripper can be calibrated by adjusting the position of the loading cart, thereby reducing the distance between the center positions of the mechanical gripper and the target spindle with yarn. In this way, the calibration can be performed quickly, improving the processing efficiency of calibration, and simultaneously improving the grabbing accuracy of the mechanical gripper.

It should be pointed out that the control parameter of the mechanical gripper or the position of the loading cart may be adjusted with reference to the target distance in actual scenarios. For example, the true relative distance of the target distance in the world coordinate system is obtained. At this time, the control parameter of the mechanical gripper or the position of the loading cart may be adjusted based on the real relative distance.

To sum up, the control methods provided in the solution of the present disclosure have the following advantages over the prior art, specifically including:

(1) More automated. Compared with the prior art, the solution of the present disclosure can quickly deal with the problem of inaccurate positioning and grabbing caused by mechanical wear, and also provide technical support for realizing the automatic calibration of the grabbing position of the mechanical gripper in the automatic packaging process of spindles with yarn. This process does not require human intervention, thus further improving the automation degree of the automatic packaging process while saving a lot of labor cost and time cost.

(2) Grabbing is more accurate. The solution of the present disclosure can provide different calibration methods based on the obtained target distance. For example, when the deviation between the center positions of the mechanical gripper and the target spindle with yarn is considered to be relatively small, the control parameter of the mechanical gripper is adjusted; or, when the deviation between the center positions of the mechanical gripper and the target spindle with yarn is considered to be relatively large, the position of the loading cart is adjusted; thus improving the accuracy of the mechanical gripper effectively.

(3) Automatic packaging efficiency is higher. The solution of the present disclosure effectively solves the problem of inaccurate positioning and grabbing of the mechanical gripper, lays the foundation for subsequently avoiding the mechanical gripper from damaging the spindle with yarn or being unable to grab the spindle with yarn due to inaccurate grabbing, and also lays the foundation for ensuring the normal operation of the packaging service of the spindle with yarn and greatly improving the packaging efficiency.

Figure 7:
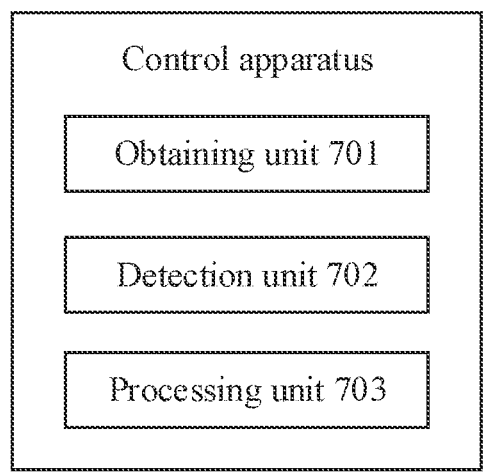
FIG. 7 is a schematic structural diagram of a control apparatus according to an embodiment of the present application.

The solution of the present disclosure further provides a control apparatus, as shown in FIG. 7, including:

an obtaining unit 701 configured to obtain a first target image collected by a first collection device and a second target image collected by a second collection device when determining that characteristic information of a mechanical gripper satisfies a first preset requirement; where the first collection device is configured to perform image collection for the mechanical gripper; and the second collection device is configured to perform image collection for a target spindle with yarn on a loading cart to be grabbed by the mechanical gripper;

a detection unit 702 configured to detect a first center position of the mechanical gripper in the first target image, and detect a second center position of the target spindle with yarn in the second target image; and a processing unit 703 configured to generate a calibration instruction when determining that a target position relationship between the first center position and the second center position does not satisfy a second preset requirement, where the calibration instruction is used to calibrate a center position of the mechanical gripper or to calibrate a center position of the target spindle with yarn to be grabbed by the mechanical gripper.

In a specific example of the solution of the present disclosure, the detection unit is specifically configured to:

input the first target image into a target detection model to obtain the first center position of the mechanical gripper in the first target image; and input the second target image into the target detection model to obtain the second center position of the target spindle with yarn in the second target image.

In a specific example of the solution of the present disclosure, the target detection model includes at least a first network layer, a second network layer and a third network layer.

Here, the first network layer includes at least a first sub-network layer, a second sub-network layer and a third sub-network layer; the first sub-network layer is configured to perform first convolution processing on an input image to obtain a first convolution feature map; the second sub-network layer is configured to perform linear processing on the first convolution feature map to obtain a linear feature map, and perform connection processing on the linear feature map and the first convolution feature map to obtain a connection feature map; and the third sub-network layer is configured to perform second convolution processing on the connection feature map to obtain a second convolution feature map.

The second network layer is configured to perform first convolution processing on the connection feature map and the second convolution feature map respectively, and perform feature fusion processing on processed results to obtain a fusion feature map.

The third network layer includes a fourth sub-network layer and a fifth sub-network layer, the fourth sub-network layer is configured to identify the mechanical gripper or the target spindle with yarn in an image based on the fusion feature map; and the fifth sub-network layer is configured to obtain the center position of the mechanical gripper in the image or the center position of the target spindle with yarn in the image based on the fusion feature map.

In a specific example of the solution of the present disclosure, the processing unit is further configured to:

estimate a target distance based on the first center position and the second center position, where the target distance characterizes a relative distance between center positions of the mechanical gripper and the target spindle with yarn in a same target coordinate system; the first center position is position information in a first coordinate system corresponding to the first target image; the second center position is position information in a second coordinate system corresponding to the second target image; and the target coordinate system is one of the first coordinate system, the second coordinate system and a world coordinate system; and generate the calibration instruction when determining that the target distance is greater than a preset threshold.

In a specific example of the solution of the present disclosure, the processing unit is specifically configured to:

estimate a first center coordinate of the mechanical gripper in the target coordinate system based on the first center position;

estimate a second center coordinate of the target spindle with yarn in the target coordinate system based on the second center position; and obtain the target distance based on the first center coordinate of the mechanical gripper in the target coordinate system and the second center coordinate of the target spindle with yarn in the target coordinate system.

In a specific example of the solution of the present disclosure, the processing unit is specifically configured to:

generate the calibration instruction when determining that the target distance is greater than a first-level critical value and the target distance is less than or equal to a second-level critical value, where the calibration instruction is used to instruct to adjust a control parameter of the mechanical gripper based on the target distance;

or generate the calibration instruction when determining that the target distance is greater than the first-level critical value and the target distance is greater than the second-level critical value, where the calibration instruction is used to instruct to adjust a position of the loading cart where the target spindle with yarn is located based on the target distance.

In a specific example of the solution of the present disclosure:

the processing unit is further configured to generate a first control instruction after completing execution of the calibration instruction; where the first control instruction is used to instruct the first collection device to collect a new first target image, and instruct the second collection device to collect a new second target image;

the obtaining unit is further configured to obtain the new first target image collected by the first collection device and the new second target image collected by the second collection device;

the detection unit is further configured to detect a first center position of the mechanical gripper in the new first target image, and a second center position of the target spindle with yarn in the new second target image; and the processing unit is further configured to determine whether a target position relationship between the first center position in the new first target image and the second center position in the new second target image satisfies the second preset requirement.

For the description of specific functions and examples of the modules and sub-modules of the apparatus of the embodiment of the present disclosure, reference may be made to the relevant description of the corresponding steps in the above-mentioned method embodiments, and details are not repeated here.

In the technical solution of the present disclosure, the acquisition, storage and application of the user's personal information involved are in compliance with relevant laws and regulations, and do not violate public order and good customs.

Figure 8:
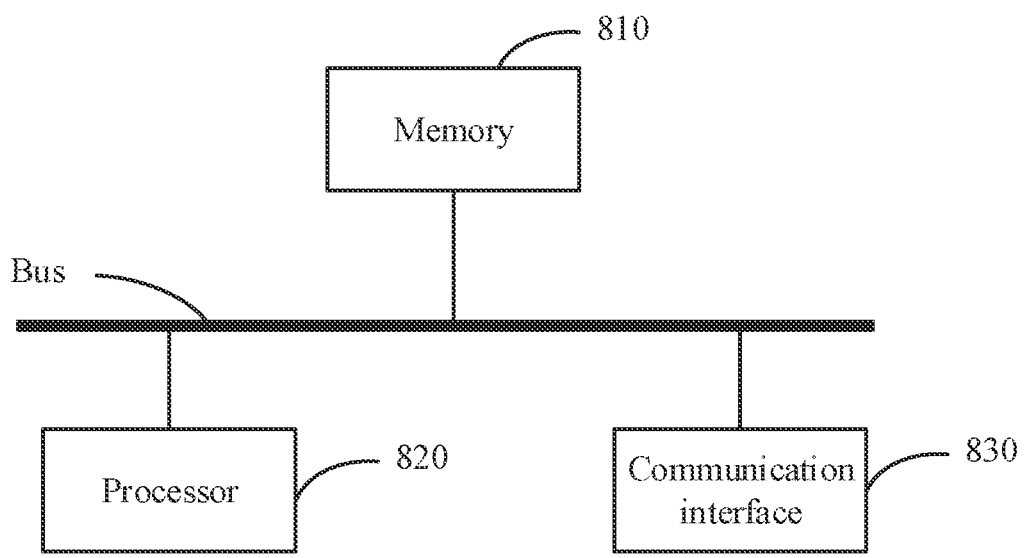
FIG. 8 is a block diagram of an electronic device for implementing the control method of the embodiments of the present disclosure.

FIG. 8 is a structural block diagram of an electronic device according to an embodiment of the present disclosure. As shown in FIG. 8, the electronic device includes: a memory 810 and a processor 820, and the memory 810 stores a computer program that can run on the processor 820. There may be one or more memories 810 and processors 820. The memory 810 may store one or more computer programs, and the one or more computer programs cause the electronic device to perform the method provided in the above method embodiment, when executed by the electronic device. The electronic device may also include: a communication interface 830 configured to communicate with an external device for data interactive transmission.

If the memory 810, the processor 820 and the communication interface 830 are implemented independently, the memory 810, the processor 820 and the communication interface 830 may be connected to each other and complete communication with each other through a bus. The bus may be an Industry Standard Architecture (ISA) bus, a Peripheral Component Interconnect (PCI) bus, or an Extended Industry Standard Architecture (EISA) bus, etc. The bus may be divided into address bus, data bus, control bus, etc. For ease of representation, the bus is represented by only one thick line in FIG. 8, but this thick line does not represent only one bus or only one type of bus.

Optionally, in a specific implementation, if the memory 810, the processor 820 and the communication interface 830 are integrated on one chip, the memory 810, the processor 820 and the communication interface 830 may communicate with each other through an internal interface.

It should be understood that the above-mentioned processor may be a Central Processing Unit (CPU) or other general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor or any conventional processor, etc. It is worth noting that the processor may be a processor that supports the Advanced RISC Machines (ARM) architecture.

Further, optionally, the above-mentioned memory may include a read-only memory and a random access memory, and may also include a non-volatile random access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Date SDRAM (DDR SDRAM), Enhanced SDRAM (ESDRAM), Synchlink DRAM (SLDRAM) and Direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above-mentioned storage medium may be a read-only memory, a magnetic disk or an optical disk, etc.

In the description of the embodiments of the present disclosure, the description with reference to the terms "one embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "I" represents or, unless otherwise specified. For example, AB may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the number of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. A control method, comprising:
    obtaining a first target image collected by a first collection device and a second target image collected by a second collection device, in a case of determining that characteristic information of a mechanical gripper satisfies a first preset requirement; wherein the first collection device is configured to perform image collection for the mechanical gripper; and the second collection device is configured to perform image collection for a target spindle with yarn on a loading cart to be grabbed by the mechanical gripper;
    detecting a first center position of the mechanical gripper in the first target image;
    detecting a second center position of the target spindle with yarn in the second target image; and
    generating a calibration instruction, in a case of determining that a target position relationship between the first center position and the second center position does not satisfy a second preset requirement, wherein the calibration instruction is used to calibrate a center position of the mechanical gripper or to calibrate a center position of the target spindle with yarn to be grabbed by the mechanical gripper.

2. The method according to claim 1, wherein detecting the first center position of the mechanical gripper in the first target image, comprises:
    inputting the first target image into a target detection model to obtain the first center position of the mechanical gripper in the first target image; and/or
    detecting the second center position of the target spindle with yarn in the second target image, comprises:
    inputting the second target image into the target detection model to obtain the second center position of the target spindle with yarn in the second target image.

3. The method according to claim 2, wherein the target detection model comprises at least a first network layer, a second network layer and a third network layer;
    wherein the first network layer comprises at least a first sub-network layer, a second sub-network layer and a third sub-network layer; the first sub-network layer is configured to perform first convolution processing on an input image to obtain a first convolution feature map; the second sub-network layer is configured to perform linear processing on the first convolution feature map to obtain a linear feature map, and perform connection processing on the linear feature map and the first convolution feature map to obtain a connection feature map; and the third sub-network layer is configured to perform second convolution processing on the connection feature map to obtain a second convolution feature map;
    the second network layer is configured to perform first convolution processing on the connection feature map and the second convolution feature map respectively, and perform feature fusion processing on processed results to obtain a fusion feature map; and
    the third network layer comprises a fourth sub-network layer and a fifth sub-network layer, the fourth sub-network layer is configured to identify the mechanical gripper or the target spindle with yarn in an image based on the fusion feature map; and the fifth sub-network layer is configured to obtain the center position of the mechanical gripper in the image or the center position of the target spindle with yarn in the image based on the fusion feature map.

4. The method according to claim 1, wherein before determining that the target position relationship between the first center position and the second center position does not satisfy the second preset requirement, the method further comprises:
    estimating a target distance based on the first center position and the second center position, wherein the target distance characterizes a relative distance between center positions of the mechanical gripper and the target spindle with yarn in a same target coordinate system; the first center position is position information in a first coordinate system corresponding to the first target image; the second center position is position information in a second coordinate system corresponding to the second target image; and the target coordinate system is one of the first coordinate system, the second coordinate system and a world coordinate system.

5. The method according to claim 4, wherein generating the calibration instruction, in the case of determining that the target position relationship between the first center position and the second center position does not satisfy the second preset requirement, comprises:
grating the calibration instruction, in a case of determining that the target distance is greater than a preset threshold.

6. The method according to claim 4, wherein estimating the target distance based on the first center position and the second center position, comprises:
estimating a first center coordinate of the mechanical gripper in the target coordinate system based on the first center position;
estimating a second center coordinate of the target spindle with yarn in the target coordinate system based on the second center position; and
obtaining the target distance based on the first center coordinate of the mechanical gripper in the target coordinate system and the second center coordinate of the target spindle with yarn in the target coordinate system.

7. The method according to claim 5, wherein generating the calibration instruction, in the case of determining that the target distance is greater than the preset threshold, comprises:
generating the calibration instruction, in a case of determining that the target distance is greater than a first-level critical value and the target distance is less than or equal to a second-level critical value, wherein the calibration instruction is used to instruct to adjust a control parameter of the mechanical gripper based on the target distance.

8. The method according to claim 5, wherein generating the calibration instruction, in the case of determining that the target distance is greater than the preset threshold, comprises:
generating the calibration instruction, in a case of determining that the target distance is greater than the first-level critical value and the target distance is greater than the second-level critical value, wherein the calibration instruction is used to instruct to adjust a position of the loading cart where the target spindle with yarn is located based on the target distance.

9. The method according to claim 1, wherein after generating the calibration instruction, the method further comprises:
generating a first control instruction after completing execution of the calibration instruction; wherein the first control instruction is used to instruct the first collection device to collect a new first target image, and instruct the second collection device to collect a new second target image;
obtaining the new first target image collected by the first collection device and the new second target image collected by the second collection device;
detecting the first center position of the mechanical gripper in the obtained new first target image, and the second center position of the target spindle with yarn in the obtained new second target image; and
determining whether the target position relationship between the first center position in the new first target image and the second center position in the new second target image satisfies the second preset requirement.

10. An electronic device, comprising:
at least one processor; and
a memory connected in communication with the at least one processor;
wherein the memory stores an instruction executable by the at least one processor, and the instruction, when executed by the at least one processor, enables the at least one processor to execute:
obtaining a first target image collected by a first collection device and a second target image collected by a second collection device, in a case of determining that characteristic information of a mechanical gripper satisfies a first preset requirement; wherein the first collection device is configured to perform image collection for the mechanical gripper; and
the second collection device is configured to perform image collection for a target spindle with yarn on a loading cart to be grabbed by the mechanical gripper;
detecting a first center position of the mechanical gripper in the first target image;
detecting a second center position of the target spindle with yarn in the second target image; and
generating a calibration instruction, in a case of determining that a target position relationship between the first center position and the second center position does not satisfy a second preset requirement, wherein the calibration instruction is used to calibrate a center position of the mechanical gripper or to calibrate a center position of the target spindle with yarn to be grabbed by the mechanical gripper.

11. The electronic device according to claim 10, wherein the instruction, when executed by the at least one processor, enables the at least one processor to execute:
inputting the first target image into a target detection model to obtain the first center position of the mechanical gripper in the first target image; and/or
inputting the second target image into the target detection model to obtain the second center position of the target spindle with yarn in the second target image.

12. The electronic device according to claim 11, wherein the target detection model comprises at least a first network layer, a second network layer and a third network layer;
wherein the first network layer comprises at least a first sub-network layer, a second sub-network layer and a third sub-network layer;
the first sub-network layer is configured to perform first convolution processing on an input image to obtain a first convolution feature map; the second sub-network layer is configured to perform linear processing on the first convolution feature map to obtain a linear feature map, and perform connection processing on the linear feature map and the first convolution feature map to obtain a connection feature map; and the third sub-network layer is configured to perform second convolution processing on the connection feature map to obtain a second convolution feature map;
the second network layer is configured to perform first convolution processing on the connection feature map and the second convolution feature map respectively, and perform feature fusion processing on processed results to obtain a fusion feature map; and
the third network layer comprises a fourth sub-network layer and a fifth sub-network layer, the fourth sub-network layer is configured to identify the mechanical gripper or the target spindle with yarn in an image based on the fusion feature map; and the fifth sub-network layer is configured to obtain the center position of the mechanical gripper in the image or the center position of the target spindle with yarn in the image based on the fusion feature map.

13. The electronic device according to claim 10, wherein the instruction, when executed by the at least one processor, before determining that the target position relationship between the first center position and the second center position does not satisfy the second preset requirement, enables the at least one processor to execute:
estimating a target distance based on the first center position and the second center position, wherein the target distance characterizes a relative distance between center positions of the mechanical gripper and the target spindle with yarn in a same target coordinate system; the first center position is position information in a first coordinate system corresponding to the first target image; the second center position is position information in a second coordinate system corresponding to the second target image; and the target coordinate system is one of the first coordinate system, the second coordinate system and a world coordinate system.

14. The electronic device according to claim 13, wherein the instruction, when executed by the at least one processor, enables the at least one processor to execute:
generating the calibration instruction, in a case of determining that the target distance is greater than a preset threshold.

15. The electronic device according to claim 13, wherein the instruction, when executed by the at least one processor, enables the at least one processor to execute:
estimating a first center coordinate of the mechanical gripper in the target coordinate system based on the first center position;
estimating a second center coordinate of the target spindle with yarn in the target coordinate system based on the second center position; and
obtaining the target distance based on the first center coordinate of the mechanical gripper in the target coordinate system and the second center coordinate of the target spindle with yarn in the target coordinate system.

16. A non-transitory computer-readable storage medium storing a computer instruction thereon, wherein the computer instruction is used to cause a computer to execute:
obtaining a first target image collected by a first collection device and a second target image collected by a second collection device, in a case of determining that characteristic information of a mechanical gripper satisfies a first preset requirement; wherein the first collection device is configured to perform image collection for the mechanical gripper; and the second collection device is configured to perform image collection for a target spindle with yarn on a loading cart to be grabbed by the mechanical gripper;
detecting a first center position of the mechanical gripper in the first target image;
detecting a second center position of the target spindle with yarn in the second target image; and
generating a calibration instruction, in a case of determining that a target position relationship between the first center position and the second center position does not satisfy a second preset requirement, wherein the calibration instruction is used to calibrate a center position of the mechanical gripper or to calibrate a center position of the target spindle with yarn to be grabbed by the mechanical gripper.

17. The storage medium according to claim 16, wherein the computer instruction is used to cause a computer to execute:
inputting the first target image into a target detection model to obtain the first center position of the mechanical gripper in the first target image; and/or
inputting the second target image into the target detection model to obtain the second center position of the target spindle with yarn in the second target image.

18. The storage medium according to claim 17, wherein the target detection model comprises at least a first network layer, a second network layer and a third network layer;
wherein the first network layer comprises at least a first sub-network layer, a second sub-network layer and a third sub-network layer; the first sub-network layer is configured to perform first convolution processing on an input image to obtain a first convolution feature map; the second sub-network layer is configured to perform linear processing on the first convolution feature map to obtain a linear feature map, and perform connection processing on the linear feature map and the first convolution feature map to obtain a connection feature map; and the third sub-network layer is configured to perform second convolution processing on the connection feature map to obtain a second convolution feature map;
the second network layer is configured to perform first convolution processing on the connection feature map and the second convolution feature map respectively, and perform feature fusion processing on processed results to obtain a fusion feature map; and
the third network layer comprises a fourth sub-network layer and a fifth sub-network layer, the fourth sub-network layer is configured to identify the mechanical gripper or the target spindle with yarn in an image based on the fusion feature map; and the fifth sub-network layer is configured to obtain the center position of the mechanical gripper in the image or the center position of the target spindle with yarn in the image based on the fusion feature map.

19. The storage medium according to claim 16, wherein the computer instruction is used to, before determining that the target position relationship between the first center position and the second center position does not satisfy the second preset requirement, cause a computer to execute:
estimating a target distance based on the first center position and the second center position, wherein the target distance characterizes a relative distance between center positions of the mechanical gripper and the target spindle with yarn in a same target coordinate system; the first center position is position information in a first coordinate system corresponding to the first target image; the second center position is position information in a second coordinate system corresponding to the second target image; and the target coordinate system is one of the first coordinate system, the second coordinate system and a world coordinate system.

20. The storage medium according to claim 19, wherein the computer instruction is used to, cause a computer to execute:
generating the calibration instruction, in a case of determining that the target distance is greater than a preset threshold.

* * * * *